US008804699B2

(12) United States Patent
Monsieux et al.

(10) Patent No.: US 8,804,699 B2
(45) Date of Patent: Aug. 12, 2014

(54) SYSTEM AND METHOD FOR SWITCHING BETWEEN PHONE SERVICES

(75) Inventors: Daniel Monsieux, Grimbergen (BE); Kris Verbeeck, Geel (BE); Tim Withofs, Brasschaat (BE); Bart Vercammen, Torhout (BE); Koen Van Oost, Schilde (BE); Dirk Van De Poel, Aartselaar (BE)

(73) Assignee: Thomson Licensing, Issy les Moulineaux (FR)

( * ) Notice: Subject to any disclaimer, the term of this patent is extended or adjusted under 35 U.S.C. 154(b) by 378 days.

(21) Appl. No.: 12/736,587

(22) PCT Filed: Apr. 28, 2009

(86) PCT No.: PCT/EP2009/055149
§ 371 (c)(1),
(2), (4) Date: Oct. 21, 2010

(87) PCT Pub. No.: WO2009/133117
PCT Pub. Date: Nov. 5, 2009

(65) Prior Publication Data
US 2011/0038364 A1    Feb. 17, 2011

(30) Foreign Application Priority Data

Apr. 30, 2008  (EP) .................................. 08447025
Dec. 5, 2008   (EP) .................................. 08447048

(51) Int. Cl.
*H04L 12/66* (2006.01)
*H04L 12/56* (2006.01)

(52) U.S. Cl.
USPC .......................................... 370/352; 370/401

(58) Field of Classification Search
CPC .......... H04Q 2213/13003; H04Q 2213/13034; H04Q 2213/13389; H04Q 2213/13196; H04Q 2213/13299; H04Q 2213/1319; H04Q 11/04; H04L 41/5087
USPC .................................................. 370/352–356
See application file for complete search history.

(56) References Cited

U.S. PATENT DOCUMENTS

| 6,657,994 | B1 | 12/2003 | Rajakarunanayake |
| 2006/0077968 | A1 | 4/2006 | Pitsoulakis et al. |
| 2006/0153169 | A1 | 7/2006 | Koifman et al. |
| 2006/0229078 | A1* | 10/2006 | Itzkovitz et al. .............. 455/445 |
| 2008/0240403 | A1* | 10/2008 | Tiso et al. ................ 379/265.01 |
| 2009/0175434 | A1* | 7/2009 | Becker ..................... 379/220.01 |

FOREIGN PATENT DOCUMENTS

| CN | 101075993 | 11/2007 |
| EP | 1827055 | 8/2007 |

OTHER PUBLICATIONS

Search Rept: Jul. 20, 2009.

* cited by examiner

Primary Examiner — Asad Nawaz
Assistant Examiner — Joel Hamel
(74) Attorney, Agent, or Firm — Tutunjian & Bitetto, P.C.

(57) ABSTRACT

The present invention concerns a gateway device and a method at the gateway, the gateway device comprising an interface to a residential phone wiring comprising more than one plugging means for connecting at least one analogue phone, a broadband interface to a network comprising a central office, the central office being adapted to provide a first voice service type to the at least one analog phone, an FXS module for providing a voice over IP service over the broadband interface to the at least one analogue phone when the first voice service type is disabled, unbundling detection means for detecting the presence of the first voice service type, connecting the FXS module to the residential phone wiring when the first voice service type is disabled, and disconnecting the FXS module from the residential phone wiring when the first voice service type is enabled, and a management agent for informing a gateway management server when changing from the first voice service type to the voice over IP service and vice versa, so that the same phone number can be used when using the first voice service type or the voice over IP service.

10 Claims, 11 Drawing Sheets

US 8,804,699 B2

SYSTEM AND METHOD FOR SWITCHING BETWEEN PHONE SERVICES

This application claims the benefit, under 35 U.S.C. §365 of International Application PCT/EP09/055149, filed Apr. 28, 2009, which was published in accordance with PCT Article 21(2) on Nov. 5, 2009 in English and which claims the benefit of European patent application No. 08447025.1, filed on Apr. 30, 2008 and European patent Application No. 08447048.3 filed Dec. 5, 2008.

FIELD OF THE INVENTION

The present invention relates generally to phone services and in particular to phones services in the residential network.

BACKGROUND OF THE INVENTION

This section is intended to introduce the reader to various aspects of art, which are related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

On a local loop, where a telephone exchange is connected to a phone located on customer premises, the analogue voice services, or plain old telephone service, noted POTS, typically use the 300 Hz to 3400 Hz frequency range. The local loop is also called the unshielded twisted pair (UTP) telephone line. The Digital Subscriber Line technology, noted DSL, uses the frequencies above the POTS range permitting to share the copper wire that was originally intended only for the public switched telephone network, noted PSTN. Typical DSL over PSTN deployments require a DSL modem to communicate with the digital subscriber line access multiplexer, noted DSLAM, located in the public switched telephone network (PSTN) telephone operator's central office (CO) and the analogue phones to be plugged to the residential phone wire through a low-pass filter. As such the analogue phone is coupled to the phone service central office, or foreign exchange station, noted FXS, and the DSL modem is coupled to the DSLAM. Hence, on the same local loop, two channels coexist: the analogue phone channel and the DSL channel.

DSL technology permits the customer premises to access the Internet through the Internet Protocol, noted IP. A DSL gateway located in the customer premises comprises a LAN interface via which devices connect to the Internet. LAN Devices may run different kinds of applications amongst which voice over IP, noted VoIP. VoIP is performed with applications running on personal computers or running embedded on gateways with either dedicated VoIP terminals connected to the LAN or regular analogue telephones connected to dedicated VoIP hardware. The LAN may be a wired network such as an Ethernet network or a wireless network such as a WiFi network. The dedicated VoIP hardware is a combination of a local foreign exchange office, noted FXO, and a local set of foreign exchange stations (FXS). The FXO is an interface that receives the PSTN service from the FXS located in the CO. It generates among others the on-hook and off-hook event indicators. The local FXSes allow the connection of an analogue phone, permitting local telephones to be connected transparently over IP to the FXS located in the CO in order to access the same PSTN services as telephones that are directly connected, via the residential phone wiring, to the PSTN. The VoIP service is not using the public switched telephone network; it is running over IP via the Internet.

Gateways supporting a VoIP service, allow two parallel paths to the PSTN. This concept enabled the removal of the PSTN CO. In such a scenario, the operator reduces operational costs and the customer premises will keep the PSTN service via VoIP. When the customer premises are no longer connected to the PSTN CO, the phones plugged to the residential phone wire can no longer access the POTS services. A DSL gateway that comprises subscriber line interface means still permits the phone plugged to the FXS interface to perform voice service with VoIP. The European Patent Application EP1827055 discloses a method, at the gateway, enabling the phones linked to the residential phone wire to perform voice services with VoIP without having to modify the residential phone wiring. This method is called re-injection hereinafter. The requirement is that the old PSTN CO is being removed from the line because the FXS port (once reinjected) takes over its function.

The FIG. 14 represents the system of EP1827055. A local loop 3 connects the customer premises 1.1 to a central office 30 to which the customer premises are connected. The central office 30 comprises a digital subscriber line access multiplexer 25, noted DSLAM, and a PSTN central office 31. The DSLAM intends to couple to the DSL gateway 1 located in the customer premise; which means that the DSL gateway registers to the DSLAM and is associated with the DSLAM in a point to point connection. It offers DSL services to the DSL gateway. It permits the customer to access the Internet 20. The PSTN central office 31 comprises a foreign exchange station 32, noted FXS. The FXS is connected to the local loop via a low pass filter 33; which is required because of the presence of the DSL connection on the local loop. This prevents the higher tones of the DSL from disturbing the working of the analogue PSTN service. The phone 7 is coupled to the PSTN CO 31, it receives the PSTN services via the FXS 32. The FXS comprises a phone subscriber line interface circuit, noted SLIC, not represented on the figure. The SLIC performs the BORSCHT functions; BORSCHT standing for battery, overvoltage, protection, ringing, supervision, codec, hybrid, and testing. The SLIC might be discretely implemented onto a line card or in an integrated circuit. The customer premises comprises an interface between the local loop and the residential phone wire, the minimum point of entry 5, noted MPOE. The residential phone wire 110 contains several plugs, 1100, 1101, in order to connect a PSTN device or a DSL device such as a DSL gateway or a DSL modem. The plug is for example a standard connector, noted RJ-11, and might be any other kind of electrical connector intended for telephony or data. The PSTN devices connected to the plug may be a wired phone, a cordless phone, a fax or a voiceband modem. A base station such as a DECT base station attached to the plug permits to connect several DECT terminals. Hereafter in the document, the phone represents all the devices intended to transmit and receive voice frequency signals. It includes for example the phone, a DECT system including the base station, the cordless phone, a fax and a voiceband modem. The DSL gateway is connected to the customer premises through the DSL interface. A phone 7 is also connected to the residential phone wire through a low pass filter 6. The DSL gateway 1 comprises a LAN interface in order to provide the access to the Internet 20 to all the devices, such as a PC 9, connected to the LAN 10. The DSL gateway comprises an interface for connection to a phone 8. The interface is an FXS interface. The phone may access the PSTN service provided by the FXS located in the PSTN central office 31. The phone 8 may also access the voice services provided by the gateway;

the phone 8 is then not coupled to the FXS located in the central office 30, it is coupled to the FXS located in the gateway 1. The gateway then performs VoIP through the DSL connection.

Traditionally, the PSTN telephone operator owns his telephone line wiring from the CO to the end-customer premises. In practice this means that subscribers can only subscribe to a DSL service if they already have a PSTN subscription with a telephone number. Telecom operators may provide VoIP services without owning PSTN infrastructure. Each customer receives one or more telephone numbers so that he/she is able to initiate or receive voice calls. For regulatory reasons, PSTN providers are obliged to unbundle the local loop to stimulate competition and allow other telecom companies to have non-discriminatory access to this part of the telecommunication network.

For customers that have a PSTN voice subscription and telephone number, the unbundling process may impact their voice service: the PSTN phone number is no longer valid and they need to switch to a VoIP subscription using a different phone number. While operators are regulatory obliged to perform loop unbundling, they want to minimize the impact on end-users and ensure continuity of the voice server, ideally without a change of telephone number from PSTN to VoIP.

SUMMARY OF THE INVENTION

The present invention attempts to remedy at least some of the concerns related to phone services switching in the prior art, by providing a device that enables seamless switching for the end user.

The invention concerns a gateway device comprising an interface to a residential phone wiring comprising more than one plugging means for connecting at least one analogue phone, a broadband interface to a network comprising a central office, the central office being adapted to provide a first voice service type to the at least one analog phone, an FXS module for providing a voice over IP service over the broadband interface to the at least one analogue phone when the first voice service type is disabled, unbundling detection means for detecting the presence of the first voice service type, connecting the FXS module to the residential phone wiring when the first voice service type is disabled, and disconnecting the FXS module from the residential phone wiring when the first voice service type is enabled, and a management agent for informing a gateway management server when changing from the first voice service type to the voice over IP service and vice versa, so that the same phone number can be used when using the first voice service type or the voice over IP service.

The invention permits to switch from a phone service provider to another phone service and keep the same phone number. The fact that the service is ensured by another provider and/or another phone service type is transparent to the end user.

According to an embodiment, the gateway comprises an FXO module is adapted for detecting the presence of the first voice service type when the FXS module is disconnected from the residential phone wiring.

According to an embodiment, the FXS module is adapted for detecting the presence of the first voice service type when the FXS module is connected to the residential phone wiring.

According to an embodiment, the FXO module performs the detection of the presence of the first voice service type based successively on the voltage level and the current level on the line between the FXO module and the central office.

According to an embodiment, the FXS module performs the detection of the presence of the first voice service type based successively on the current level and the voltage level on the line between the FXS module and the central office.

Another object of the invention is a method in a gateway comprising an interface to a residential phone wiring comprising more than one plugging means for connecting at least one analogue phone, a broadband interface to a network comprising a central office, the central office being adapted to provide a first voice service type to the at least one analog phone, an FXS module for providing voice over IP services over the broadband interface to the at least one analogue phone when the first voice service type is disabled. The method comprises the steps of performing detection of a first voice service type, if a first voice service type is not present, connecting the FXS to the residential phone wiring, and signaling the FXS connection to a remote server so that the same phone number can be used when using the first voice service type or the VoIP service.

According to an embodiment, the method comprises the steps of, if a PSTN service is present, and the FXS is connected to the residential phone wiring, disconnecting the FXS from the residential phone wiring, and signaling the FXS disconnection from the residential phone wiring to a remote server so that the same phone number can be used when using the PSTN service or the VoIP service.

According to an embodiment, the detection of a PSTN service is continuously performed.

According to an embodiment, the method comprises the steps of, if the FXS is disconnected from the residential phone wiring, measuring the voltage of the line between the FXO and the central office, and if the voltage is below a FXO_voltage_threshold value, connecting the FXS to the residential phone wiring.

According to an embodiment, the method comprises the steps of, if the voltage is above the FXO_voltage_threshold, measuring the current on the line, and if the current is below a FXO_current_threshold, connecting the FXS to the residential phone wiring.

According to an embodiment, the method comprises the steps of, if the FXS is connected to the residential phone wiring, measuring the current of the line between the FXS and the central office, if the current is above a FXS_current_threshold value, measuring the voltage of the line, and if the voltage is above a FXS_voltage_threshold value, disconnecting the FXS from the residential phone wiring.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

In the figures, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of residential networks that subscribes to two different phone services, but the invention is not limited to this particular environment and may be applied within other frameworks where an end user may switch between concurrent services using the same service identifier. The embodiment applies to VoIP and PSTN services. Of course it applies to switching between different PSTN service providers and/or VoIP providers. The embodiment also applies to phone services. Of course it also applies to any service where an identifier is used, and that can be used with multiple services providers.

Figure 1:
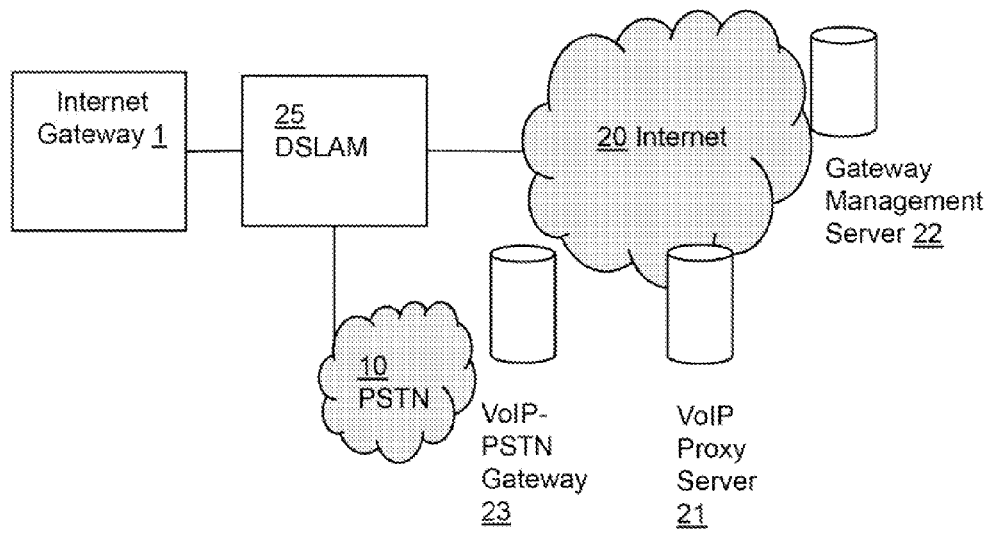
FIG. 1 is a block diagram of a system compliant with the embodiment.
Figure 2:
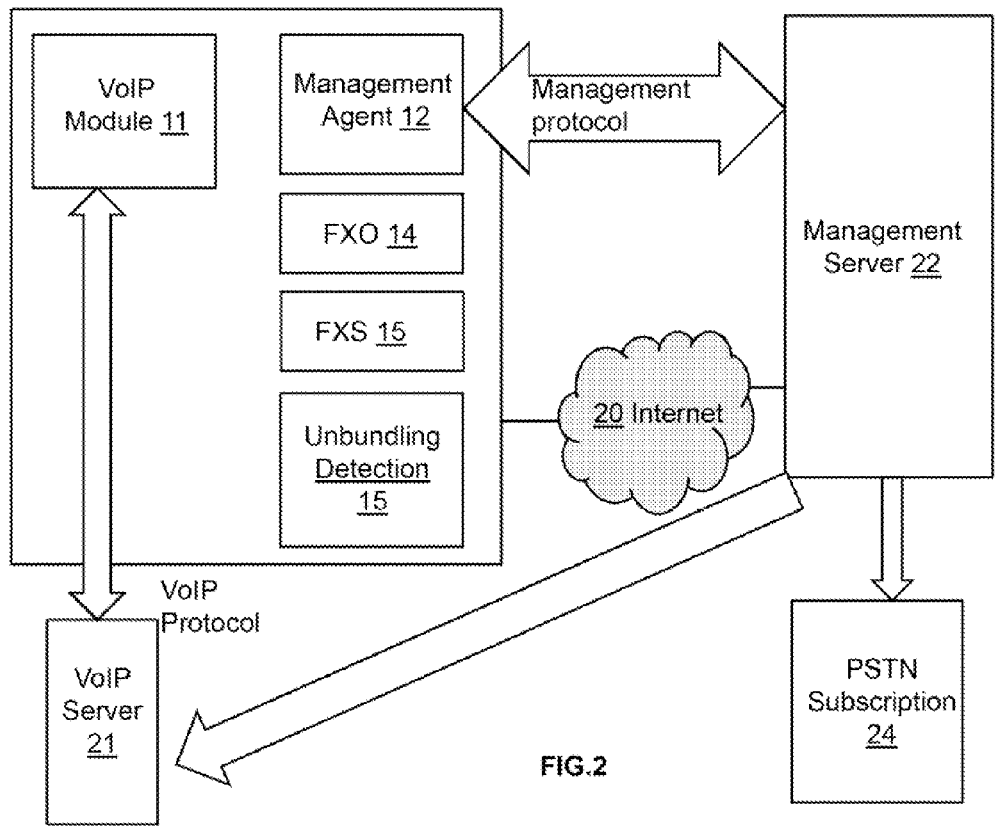
FIG. 2 is a block diagram of an object compliant with the embodiment.

The system according to the embodiment is described in FIG. 1. An Internet gateway 1 connects a local network to the Internet network and to the PSTN network through a DSLAM 25. The Internet gateway 1, represented in more details in FIG. 2, comprises the following modules. A VoIP Module 11 implements VoIP functions. In particular, it changes analog telephone calls into VoIP data and signaling protocols. A Management Agent 12 is adapted to communicate with a management server 22. It performs management actions such as providing information or applying configuration changes. The management agent 12 performs the management protocol as specified in the TR-069 standard: "Technical Report, TR-069, CPE WAN Management Protocol, dated May 2004 from the DSL-Forum". An Unbundling Detection module 13 is adapted to detect loop unbundling via absence of line current/voltage on the UTP line from the central office (CO) as described hereinafter. It comprises a signal reinjection state machine as defined hereinafter. The Internet gateway 1 also comprises an FXO 14 and an FXS 15. Of course it could comprise more than one FXS.

The Management Server 22 is a server communicating with gateway management agents 12. It is under the control of the service provider. It is integrated with service provider management systems, diagnostics/troubleshooting systems and helpdesk. The management server 22 is also called a gateway management server or auto-configuration server (ACS). The VoIP Server 21 is a VoIP proxy/registrar/gateway server which communicates with the gateway VoIP module 11 to relay phone calls and "hold"/manage the subscriber VoIP telephone numbers. The VoIP-PSTN gateway 23 is a server that enables to make calls between VoIP and PSTN voice networks; The VoIP-PSTN gateway 23 is connected to the PSTN 10 and to the Internet 20. So using a VoIP "phone" (or VoIP DSL gateway), users can still dial PSTN telephone numbers. The PSTN Subscriptions device 24 is a database with PSTN subscribers. It comprises their phone number and billing address.

The unbundling detection component 13 detects absence of current/voltage on the UTP telephone line. It notifies that detection to the gateway management agent 12. It automatically detects the presence of a CO interface without need for signaling. When the CO is not present, the line current/voltage is not present. The line can be considered as being unbundled. The unbundling detection component is now further detailed.

Figure 7:
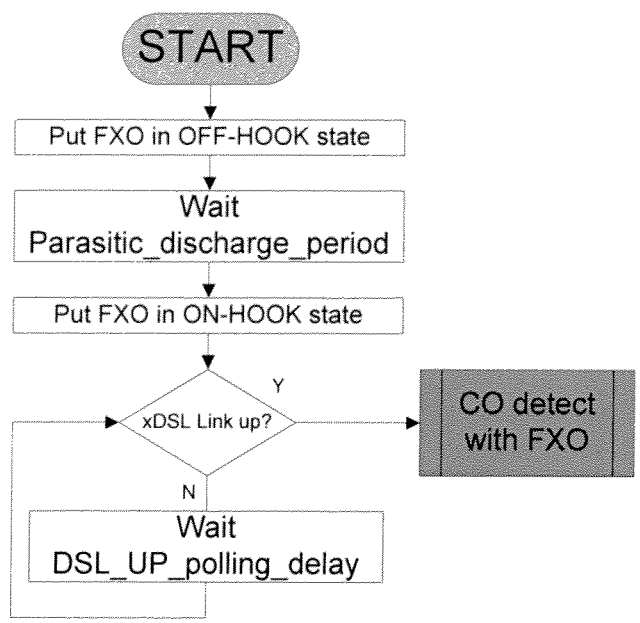
FIG. 7 is a state machine illustrating a gateway starting up.

When the gateway starts up, the signal reinjection state machine is started, as indicated in FIG. 7. The voice stack sets the FXO in the off-hook state for a "Parasitic_discharge_period". This allows the discharge of any combination of unwanted capacitors, such as external parasitic capacitors or inter-layer parasitic capacitors on the PCB. Then, the FXO is set back in the on-hook state and the status of the xDSL link is polled periodically with "DSL_UP_polling_delay" in order to resume the state machine. Until the xDSL link is up, and the VoIP service can connect to the VoIP server, no action is taken.

Figure 8:
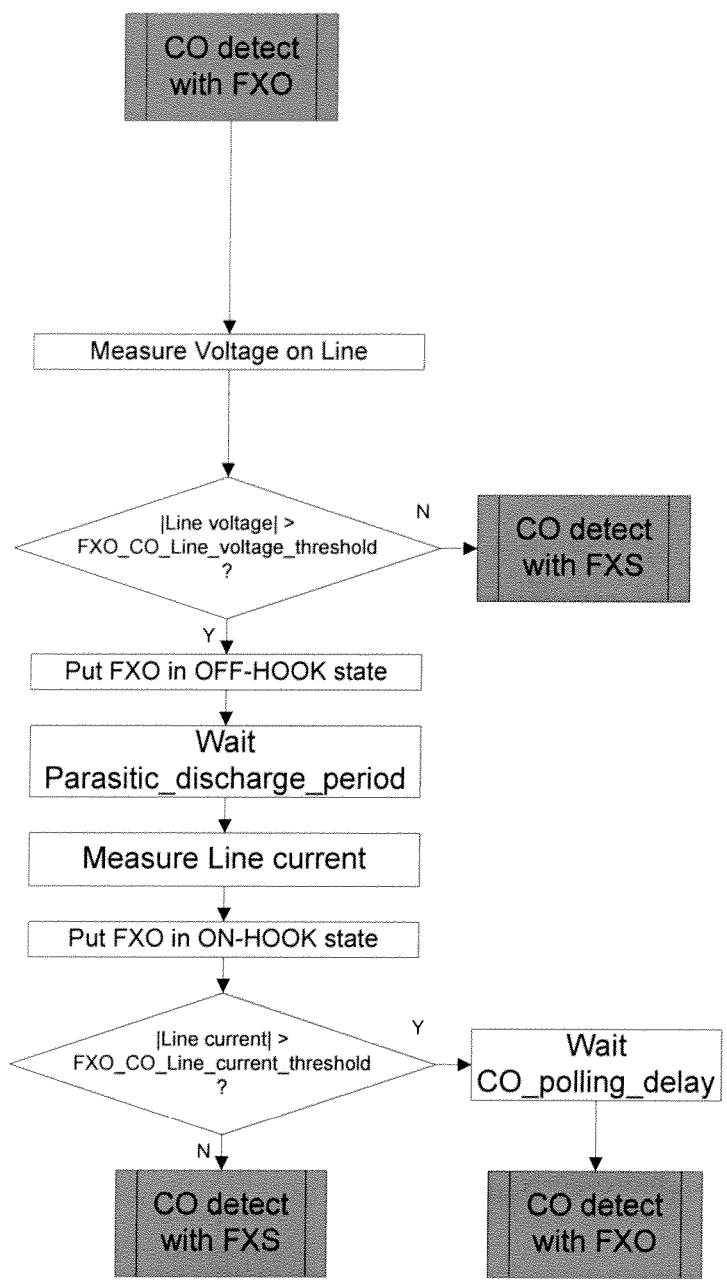
FIG. 8 is a state machine illustrating a central office detection via the FXO.

The CO detection via the FXO is illustrated in FIG. 8. Once the xDSL link is up, the FXO determines if PSTN services are present or not. This is done in two steps in order to catch false CO detections due to parasitic capacitors between the signal wires in a bundle, or due to old phones with a loaded capacitor that are on the line.

First, the FXO measures the line voltage. If it is less than "FXO_CO_line_voltage_threshold", it is assumed that no PSTN is available and that the FXO is being disconnected from the telephone line.

If the line voltage is not less than "FXO_CO_line_voltage_threshold", it can not be directly assumed that there is a PSTN CO active on the line.

A same bundle may contain multiple pairs. All the pairs in a bundle don't necessarily make use of signal reinjection because some users want to keep using their classic PSTN line. Hence the telephone bundle, also called trunk, comprises pairs on which PSTN is still active, where signal reinjection is not applied, also called NON-SR pairs. The telephone bundle also comprises pairs on which signal reinjection is applied.

Parasitic capacitors, present between two pairs in the same bundle can be charged up to the line voltage of the non-SR pair, hence the FXO sees a voltage on the line that is equal to the normal line voltage. In order to avoid false detection, the FXO is being put into the off-hook state and after a "Parasitic_discharge_period" the line current is measured. If the line current is above "FXO_CO_line_current_threshold", it is assumed that the CO Line feed is still active and hence the CO detection procedure is repeated after a "CO_polling_delay". If no current exceeding the "FXO_CO_line_current_threshold" is seen, then the FXO can be removed from the telephone line and the FXS can be used as a PSTN CO.

When the FXS has already been connected with the line, the relay does not need to be switched again. Therefore a flag is set to mark that the FXS was already on the line.

Figure 9:
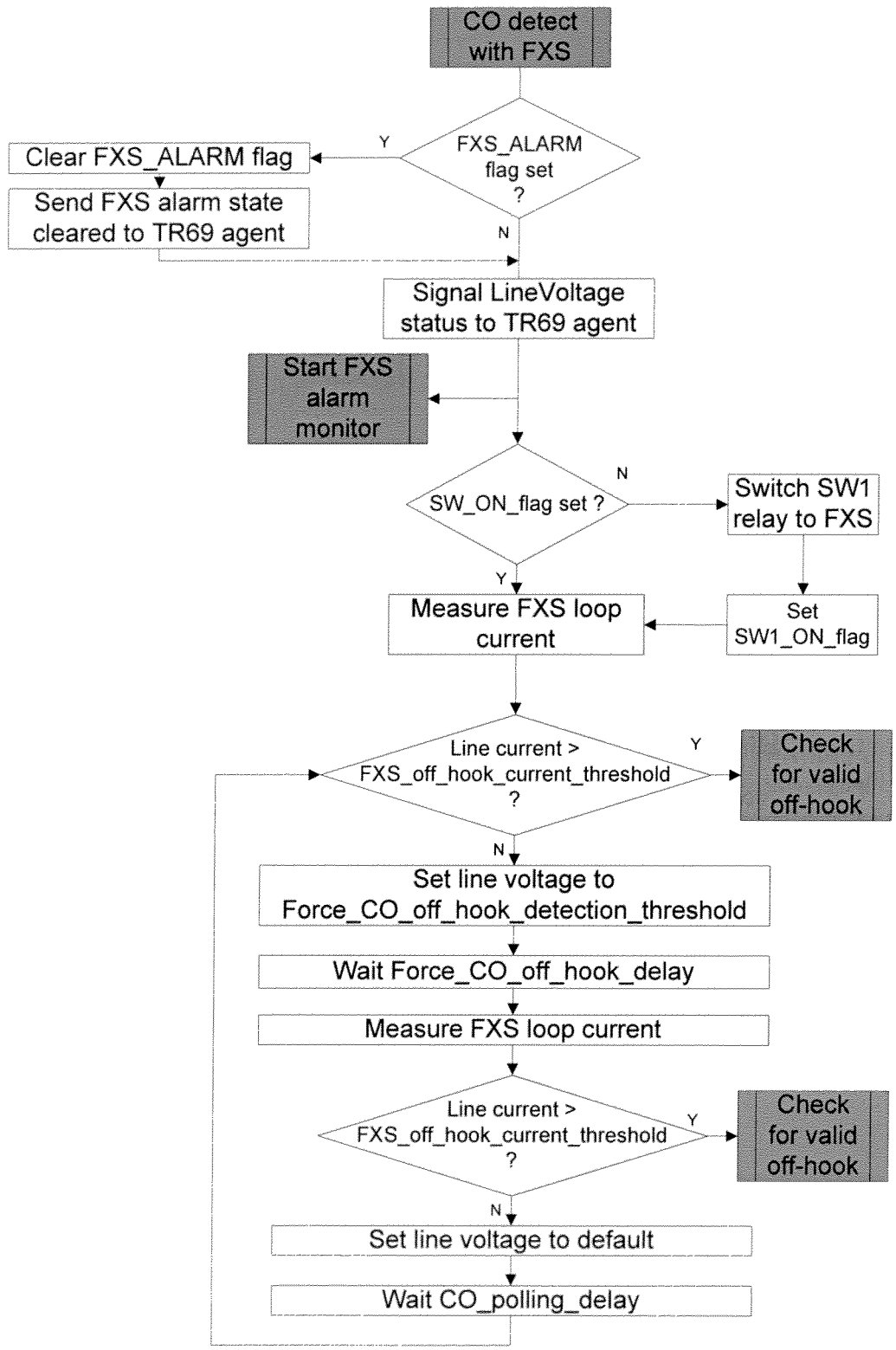
FIG. 9 is a state machine illustrating a central office detection via the FXS.

The CO detection via the FXS is illustrated in FIG. 9. When the FXO has determined that there is no active PSTN CO on the telephone line, the FXS is being connected to the line and acts as a PSTN CO. Together with the FXS, the alarm monitor is started and is further described hereinafter. It notifies the software of possible hazardous conditions occurring on the telephone line. It is common practice for SLICs to monitor the line and react on hazardous events by signaling this through hardware.

The new status is also being signaled to the TR69 agent (active send), located in the management agent 12. In order to make sure that the FXS port can remain active as a CO, it keeps checking for the presence of a "rogue" PSTN CO (A "rogue" PSTN CO can appear on the line as result of human and/or software errors), this is done via "current polling" of the line. Current polling is based on checking whether the "FXS_Off_hook_current_threshold" is exceeded or not. The current threshold can be exceeded in multiple ways. Either a CO is suddenly present on the line or there is a valid off-hook event. It is important that the FXS can distinguish between valid and fake off-hook events.

When a PSTN CO is connected to an FXS port, there are 4 possible scenarios:
   If V_Line FXS>V_line PSTN CO, forward current leaks from FXS to PSTN CO
   If V_Line FXS<V_line PSTN CO, reverse current leaks from FXS to PSTN CO
   If V_line FXS equals to V_line PSTN CO, there is no current flow
   Reverse polarity connection: PSTN CO line polarity is not equal to the FXS line polarity.

The "reverse polarity" feature may appear as follows. Both CO and FXS can reverse the polarity of the line feed (swap tip and ring basically). These scenarios generally map on the ones identified above, unless the PSTN CO and FXS are both in the opposite polarity, in which case an alarm is triggered in the SLIC and the FXS is automatically detached from the line.

All scenarios with current flow are straightforward and can be handled with a "check for valid off-hook" procedure as explained hereinafter. The only exception is scenario 3 because a different approach is needed which is not required during call handling as there is already current flowing.

In order to detect the presence of a PSTN CO, current needs to flow. This is the only detection method a SLIC has to figure out if there is another current source on the line. In the case there is no current flowing through the SLIC (or current that is not higher than the off-hook detection threshold), a brute force mechanism is periodically used to force current flow (in any direction).

When no current is flowing, the FXS Line voltage is lowered to the "Force_CO_off_hook_detection_threshold" value for a delay set to "Force_CO_off_hook_delay". This voltage value is chosen rather low compared to normal PSTN line voltage so that current starts to flow (and an off-hook event is triggered) when a PSTN CO is present. If no detection has been made, the FXS Line voltage is restored to the default level and after a "CO_polling_delay" the current is polled again.

Figure 10:
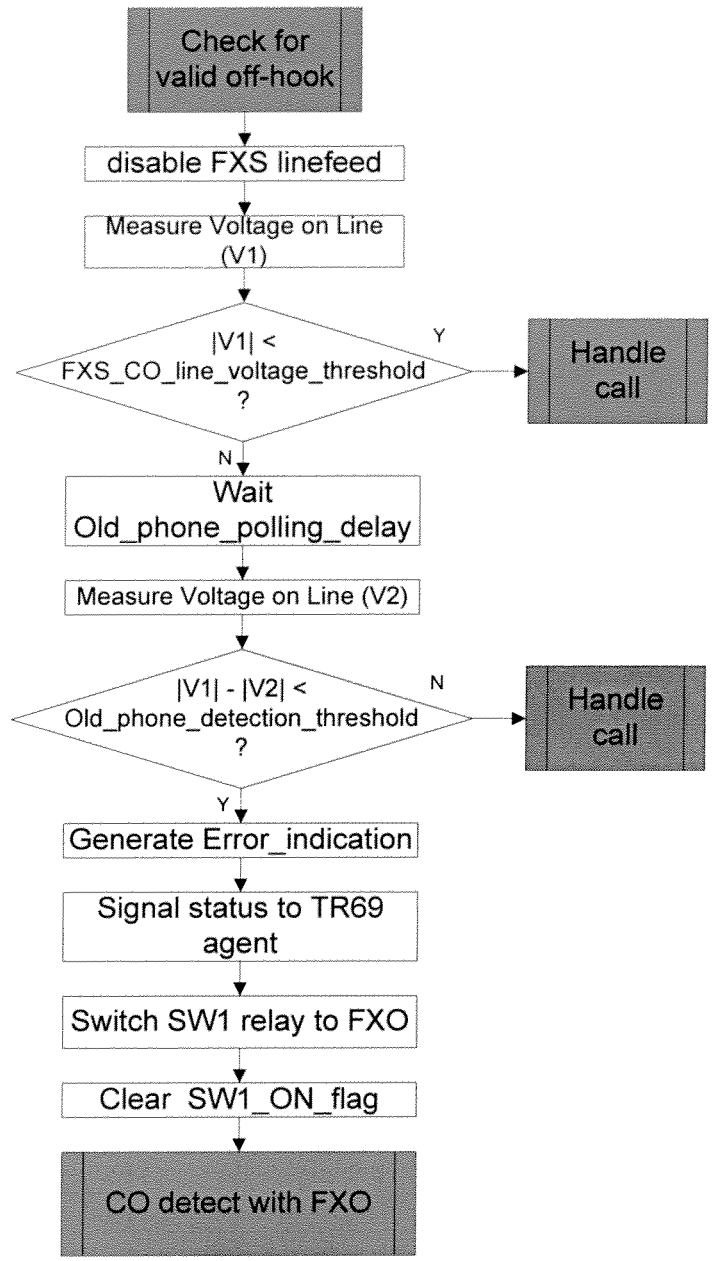
FIG. 10 is a state machine illustrating a check for valid off-hook.

When the "FXS_Off_hook_current_threshold" value is exceeded, the FXS port determines if there is a valid off-hook or that one of the "PSTN CO active" scenarios is applicable. This is illustrated in FIG. 10.

In order to check for CO presence, the FXS Line feed is disabled and the voltage on the telephone line is measured. If the line voltage is below the "FXS_CO_line_voltage_threshold" value, then a normal phone is attached to the FXS port. Hence the call is handled normally. However, it is possible that an old telephone set is attached to the FXS port. Old telephone sets usually embed a large capacitor that is connected between tip and ring. When line feed is disabled, this capacitor starts to be drained by the FXS being off-hook; hence the line voltage drops. Therefore a second polling of the line voltage is done after an "Old_phone_polling_delay". If the difference between the two consecutive measurements is larger than the "Old_phone_detection_threshold", the FXS handles the call normally. Otherwise, the PSTN CO line feed is on and the FXS signals an indication ("Error_indication"+ notification to TR69 agent that the CO voltage is present) that a CO is detected before it is removed from the telephone line.

When an off-hook event is recognized as being a valid one, the call is being processed by the FXS port. During the call the FXS keeps checking for the presence of a PSTN CO. If a CO is enabled during the call, the FXS port is not capable of terminating the call (the on-hook state transition of the phone set is not detected because the PSTN CO keeps the line in the off-hook state).

Figure 11:
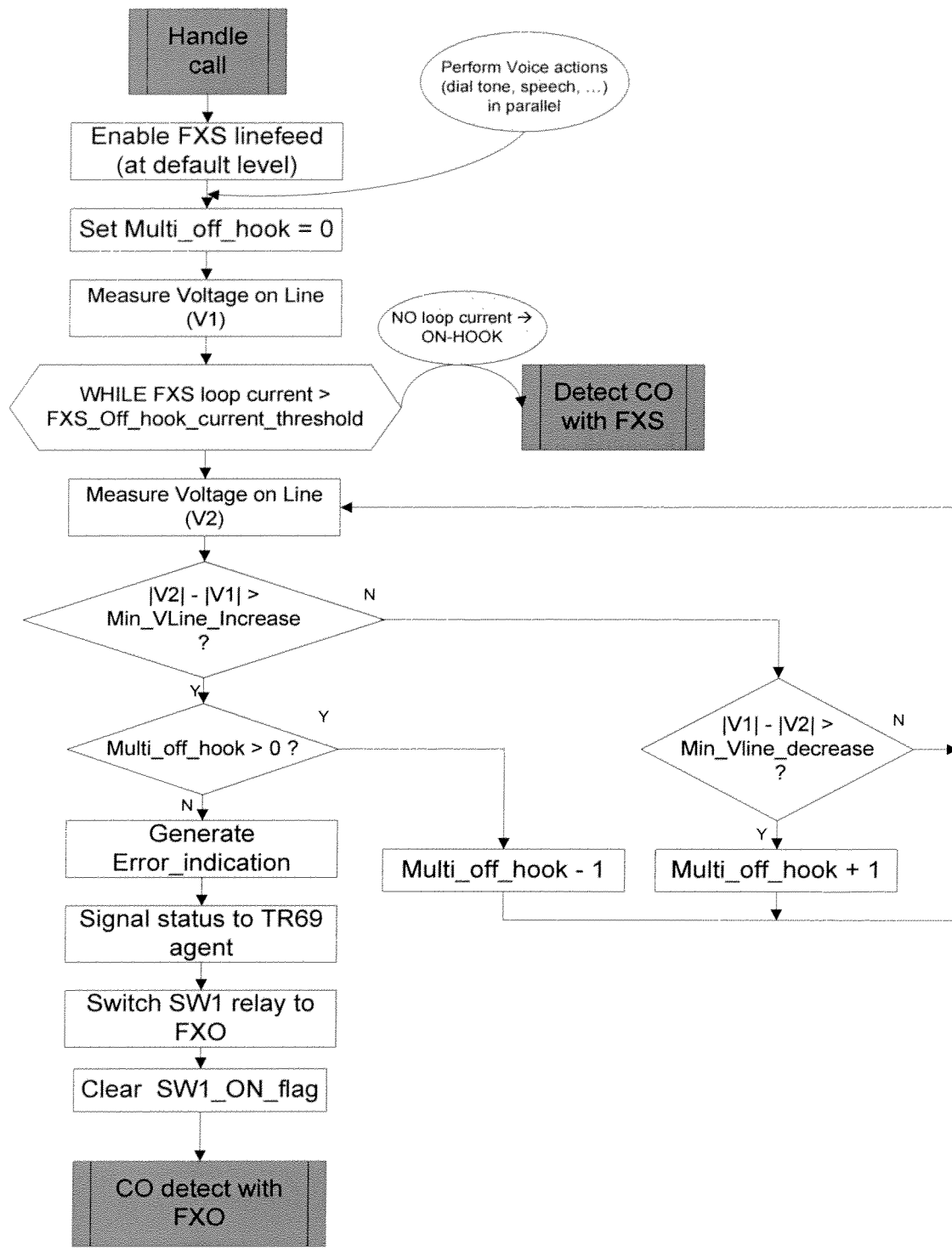
FIG. 11 is a state machine illustrating a central office detection during a call.
Figure 12:
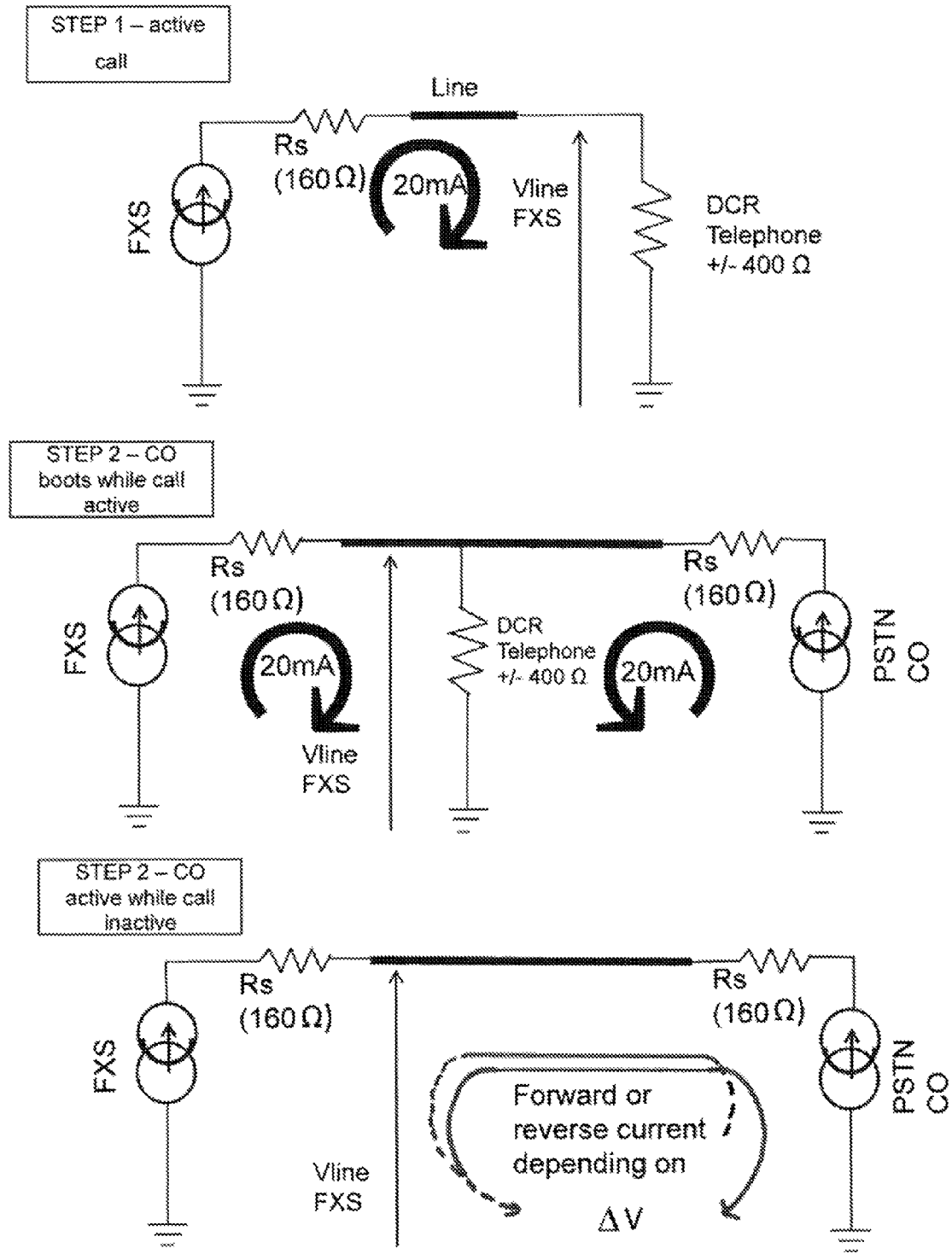
FIG. 12 illustrates a central office detection during a call.

When the call is terminated and the phone changes to on-hook state, the FXS still sees current flowing. Hence the VoIP call is not terminated which can lead to billing issues. Therefore an additional detection mechanism is needed as illustrated in FIGS. 11 and 12.

When a call is processed, the FXS line voltage is measured and stored. This is the initial line voltage. It is important to record this voltage as it can change during a call due to allowed or rogue off-hook/on-hook transitions. Then, as long as there is current flowing, the line voltage is polled continuously. Otherwise the call is terminated and the state machine jumps back to "detect CO with FXS". If the line voltage drops, because a second phone is in the off-hook state, then the "Multi_off_hook" counter in increased. When the line voltage is increased, the "Multi_off_hook" counter is decreased. The counter however can not drop below zero. If this happens it means that the line voltage increased without any previous off-hook event being recorded, hence a PSTN CO was connected to the line. If there are two current sources active on the same line, then the line voltage rises due to the fact that the current though the phone in the off-hook state is increased. If a CO should connect to the line with reverse polarity, there will not be an increase of the line voltage but the FXS will detect an alarm condition on the line and detach itself and the gateway will signal and error event through the alarm handler ("Error_indication"+notification to TR69 agent that the CO voltage is present). When a CO is detected, the FXS signals an indication ("Error_indication"+notification to TR69 agent that the CO voltage is present) that a CO is detected before it is removed from the telephone line. Should a CO connect to the line with reverse polarity, there will not be an increase of the line voltage but the FXS will detect an alarm condition on the line and detach itself and the gateway will signal and error event through the alarm handler ("Error_indication"+notification to TR69 agent that the CO voltage is present).

The rise/fall threshold for the detection mechanism is determined by the "Min_Vline_increase" and the "Min_Vline_decrease".

Figure 13:
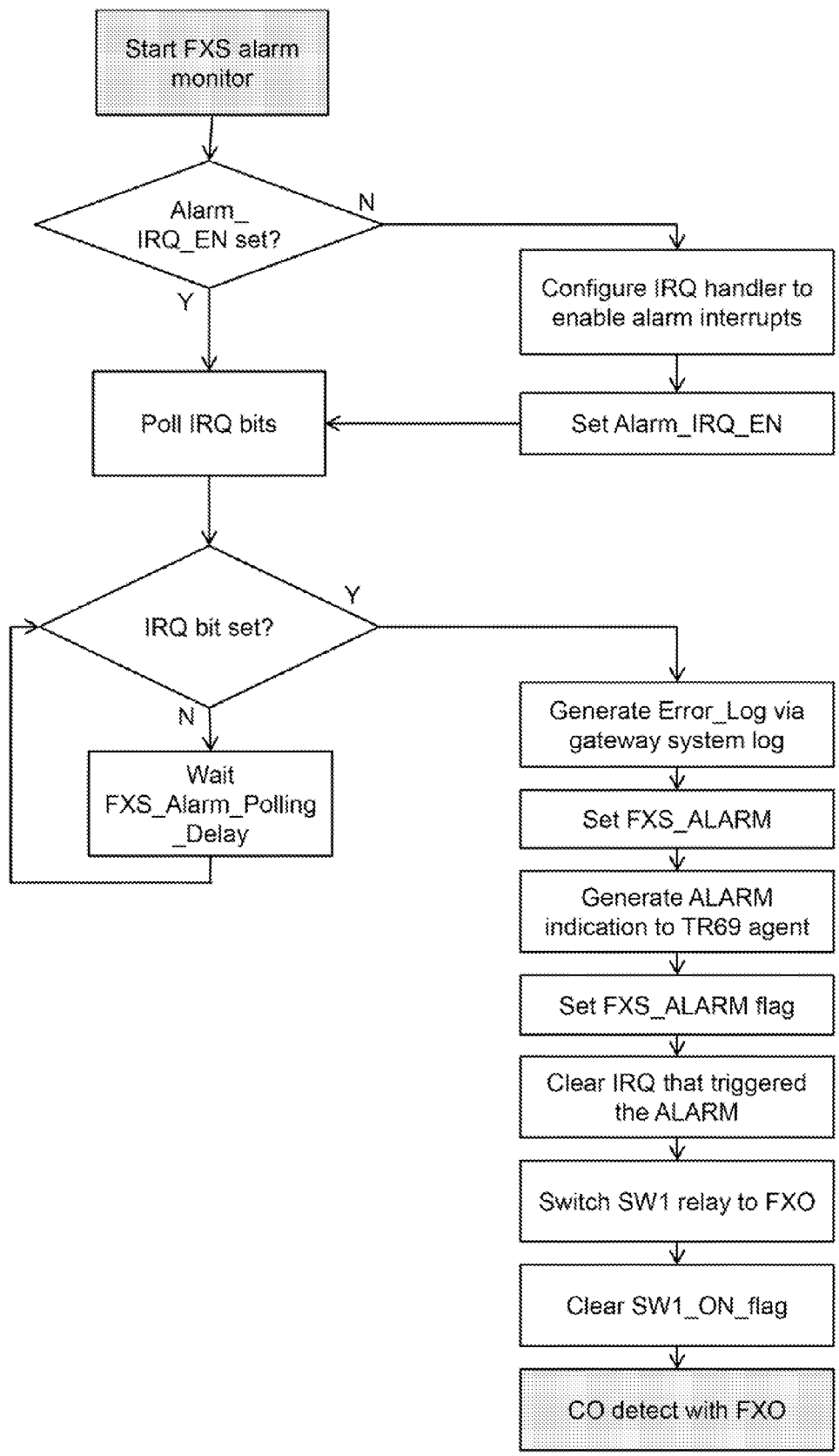
FIG. 13 is a state machine illustrating alarm monitoring.
Figure 14:
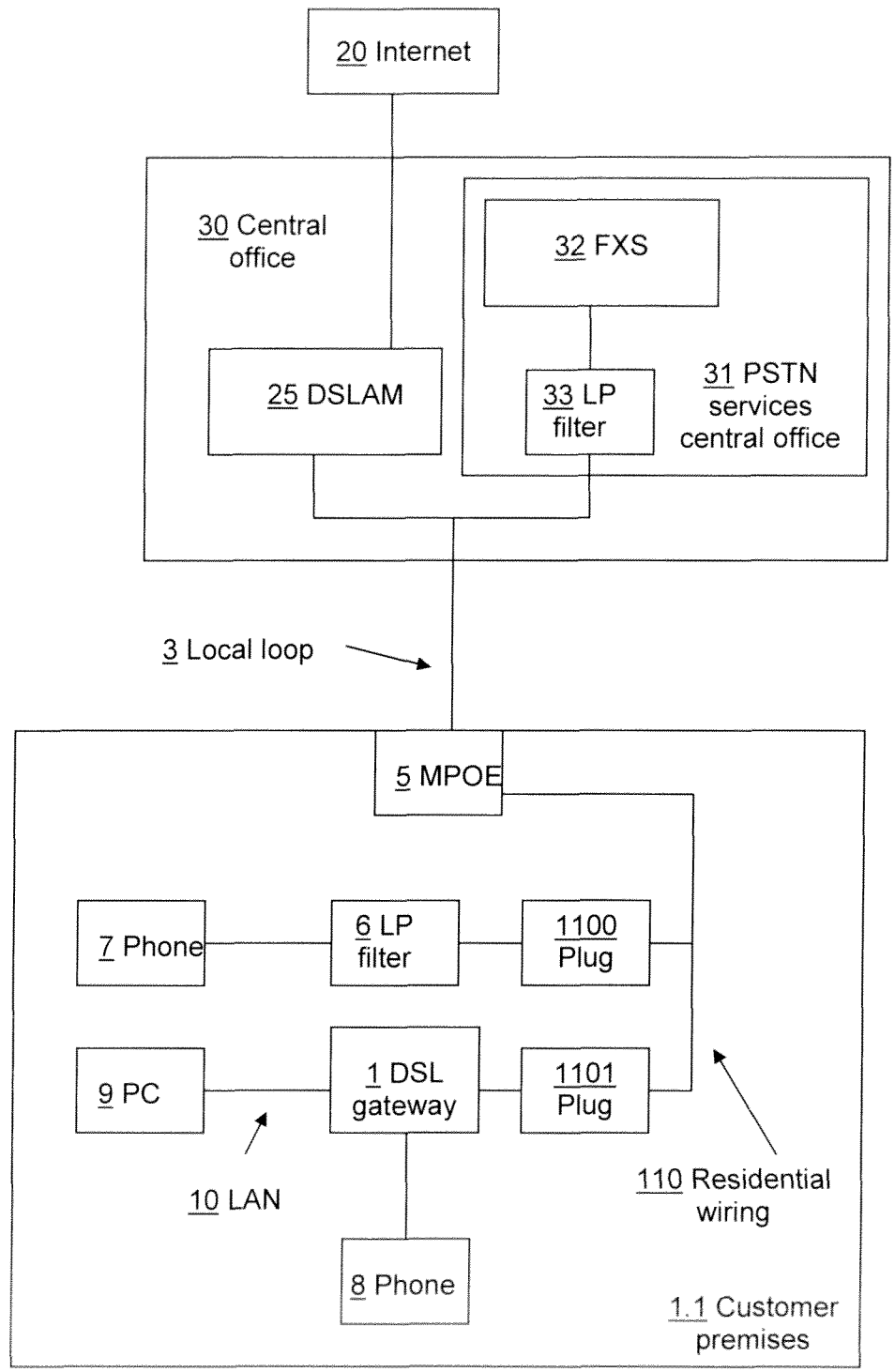
FIG. 14 is a block diagram of premises connected to a central office.

During FXS operation, the FXS port monitors for the presence of "alarm conditions" on the line, as illustrated in FIG. 13. Several error events that might damage the SLIC are checked. Such fault conditions are divided into two types, Power or Thermal alarms. A Power alarm is generated when there is an over-voltage or over-current condition (forward and reverse). Thermal alarms are present due to excessive heat production in the SLIC (related to over-voltage or over-current).

The SLIC must "by default" react on such conditions by disabling the linefeed function and detaching itself from the line. Afterwards it is up to the host processor to resume the FXS functionality.

When the FXS is active on the line, starting in procedure "CO detect with FXS" described hereinabove, the alarm monitor is also started. Initially, the monitor needs to be configured via an interrupt handler. The alarm interrupts must be activated before doing anything with the FXS port. When interrupts are configured, the "Alarm_IRQ_EN" flag is set. It is only unset via a power reboot of the gateway. Afterwards the host CPU keeps polling if the interrupt request bits (IRQ) are being set or not with a polling delay that is programmed by an "FXS_Alarm_Polling_Delay".

When either one of the interrupts is set, Power or Thermal, the host generates an error event in the "gateway system log". The FXS is removed from the line, the remote TR69 agent is notified of an alarm event and the FXO is used to check for the presence of a PSTN CO.

In order not to generate fast changing events in the TR69 agent, the alarm signal (when generated) is only cleared when the FXO to FXS transition is signaled. In this way, the FXS alarm state is present on the TR69 agent as long as the system has not recovered from it. When the system is again capable to use the FXS port as local VoIP CO, it signals this and then the alarm status is cleared.

Figure 3:
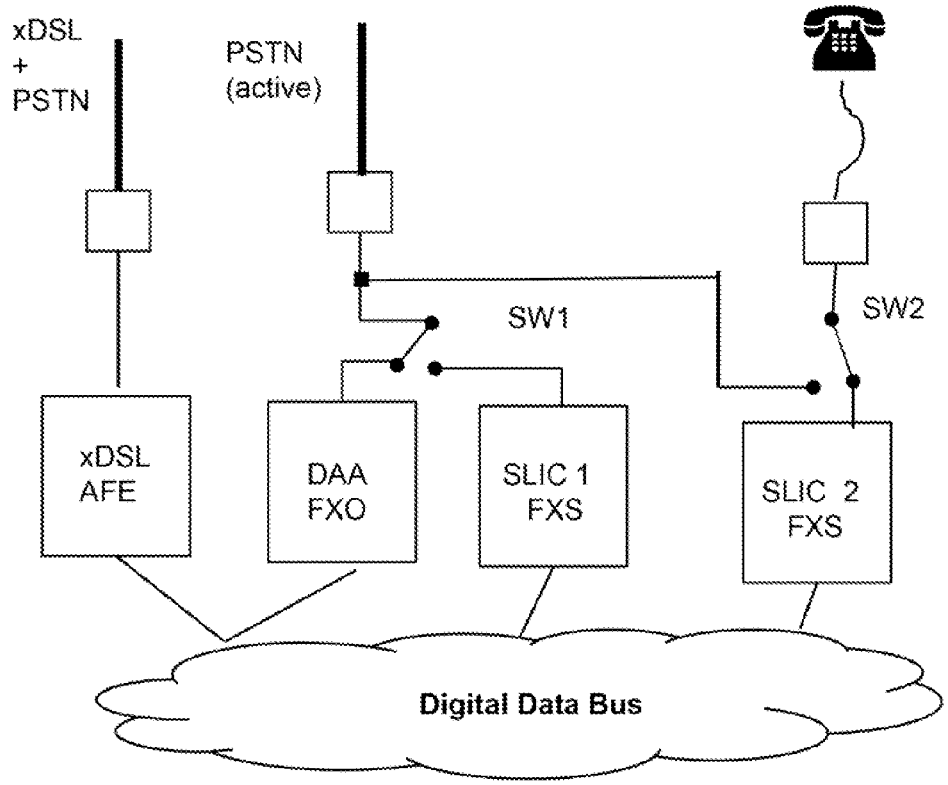
FIG. 3 is a first block diagram of an object compliant with the embodiment.
Figure 4:
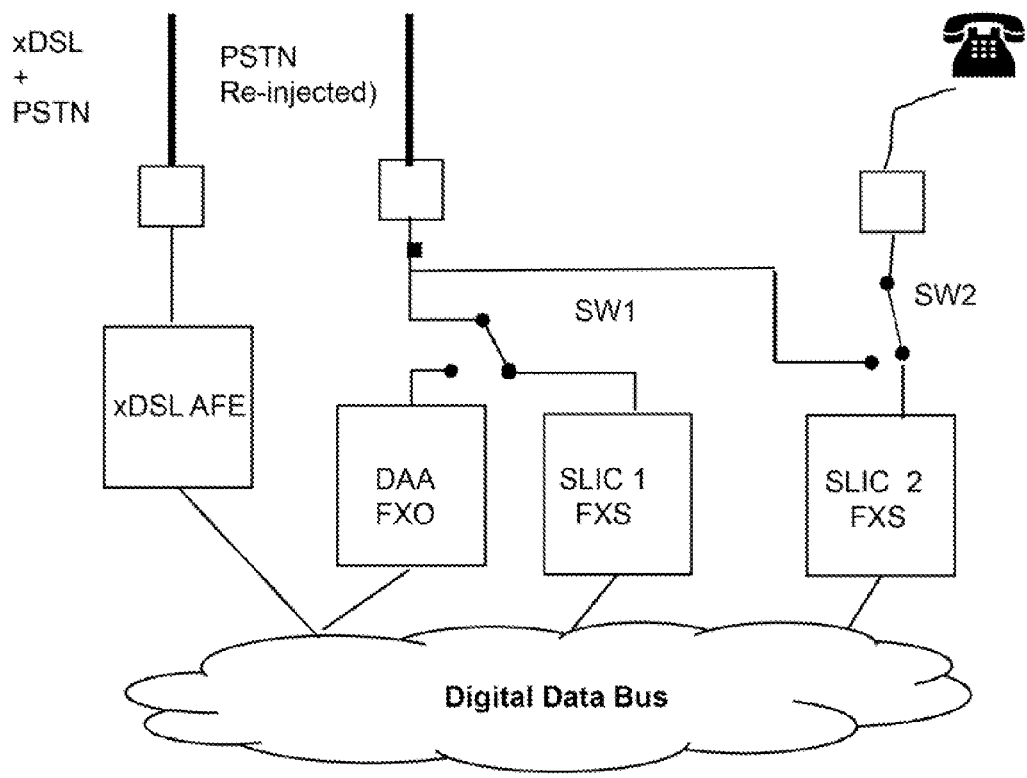
FIG. 4 is a second block diagram of an object compliant with the embodiment.

The re-injection is activated as illustrated in FIGS. 3 to 6. FIGS. 3 to 6 represent the switching features of the gateway according to the embodiments. In the configurations of FIGS. 3 and 4 there is a central external filter feeding the PSTN signals from the residential wiring to the gateway (not represented). Then, on the same local loop, two channels coexist: the analogue phone channel and the xDSL channel. The gateway comprises an interface to the xDSL channel, and another interface to the PSTN (local via FXS through FXO or classic via PSTN CO). The gateway also comprises a FXS interface to an analogue phone. The gateway comprises an analogue front-end, xDSL AFE, interfacing to the xDSL. It comprises an FXO and two FXS. FXO and FXS are connected through the digital data bus of the gateway. It is an internal voice over IP communication bus.

In FIG. 3, there is no re-injection; the switch SW2 is positioned so that VoIP service is provided to the analogue phone and SW1 is positioned so that either PSTN service or VoIP service can be provided to that analogue phone. The switch SW1 connects the FXO or SLIC1 to the PSTN. The switch SW2 connects the analogue phone interface to SLIC2. SLIC2 is connected to the FXO through the digital data bus. In FIG. 4 there is re-injection; SW2 position permits to provide VoIP service and SW1 position permits to provide re-injection VoIP service.

Figure 5:
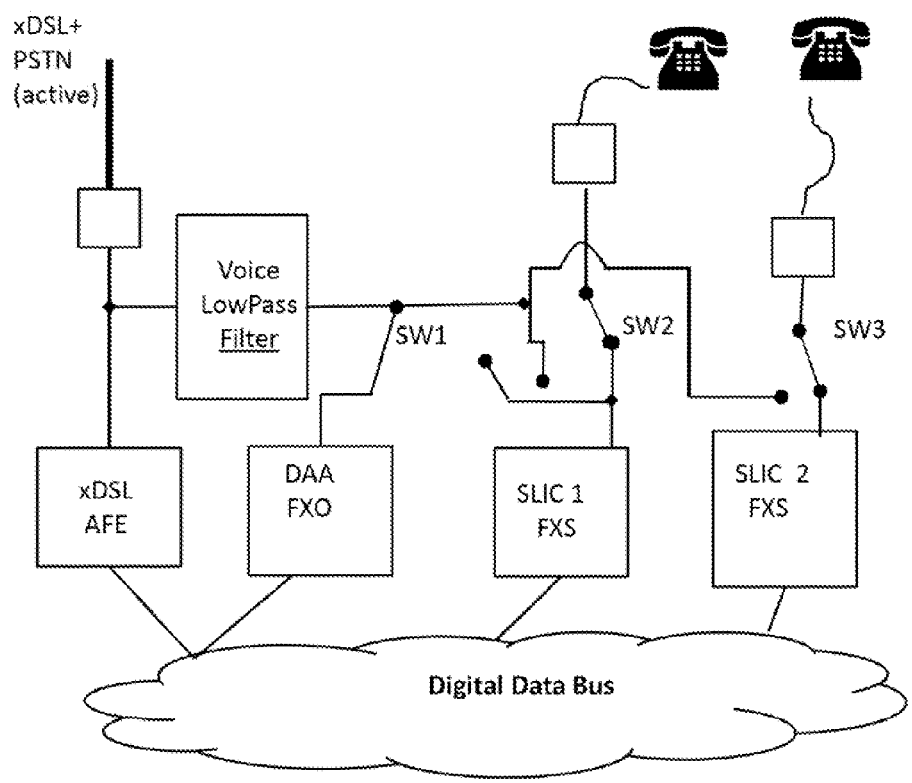
FIG. 5 is a third block diagram of an object compliant with the embodiment.
Figure 6:
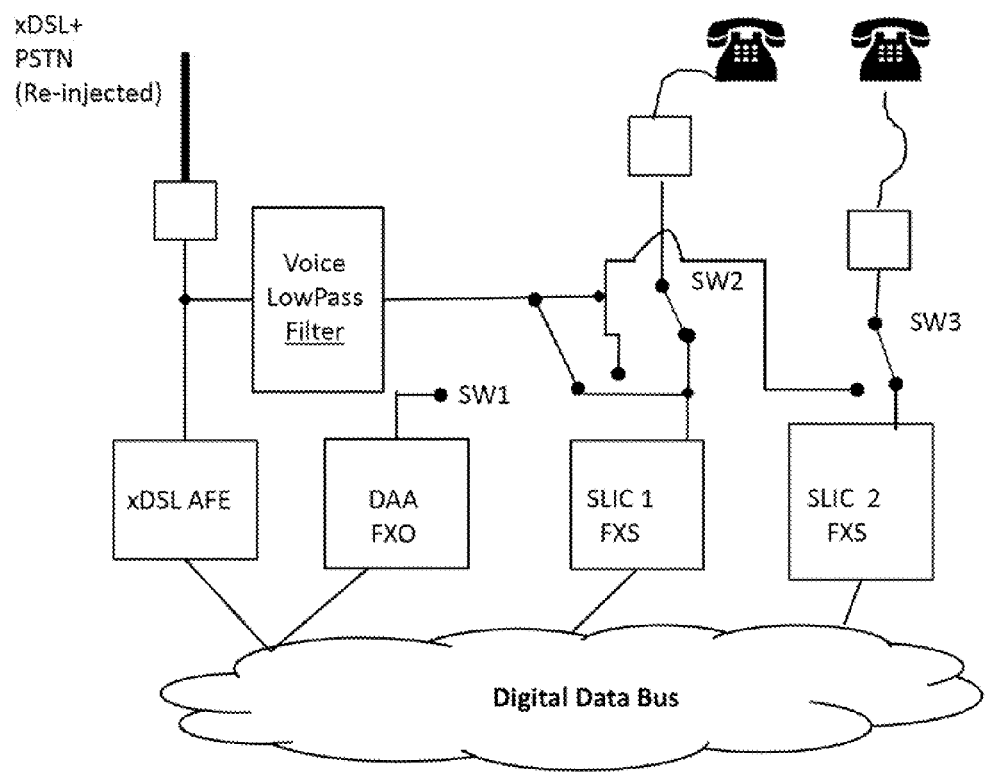
FIG. 6 is a fourth block diagram of an object compliant with the embodiment.

In FIGS. 5 and 6 there is no central external filter. The xDSL and the PSTN are provided over the same channel to the gateway but the PSTN service is separated from the xDSL by an internal low-pass filter. In FIG. 5, there is no re-injection; SW2 and SW3 position permit to provide VoIP service, and SW1 position permits to provide PSTN service. In FIG. 6, there is re-injection; SW3 position permits to provide VoIP service, SW2 position permits to provide VoIP service and enables 2nd phone, SW1 position permits to provide "re-injection" service.

More generally, re-injection permits the dynamic reuse of the residential telephone wiring and a transparent delivery of either PSTN or VoIP services by the gateway, by extending the use of the FXS port.

The gateway management agent initiates an alarm/notification message to the management server. It uses TR-69 as a management protocol. The notification is an "active notification" that is sent to the auto-configuration server. In terms of TR-69, a parameter is defined to indicate whether or not current/voltage is detected on the UTP line. The parameter name is a Boolean parameter with values True/False or 1/0: InternetGatewayDevice.Services.VoiceService[i].X_00E50_FXODCVoltageRemoved.

The management server has previously subscribed to be immediately notified when the LineCurrent value changes. It uses a SetParameterAttributes RPC/command of the TR-069 protocol. The management server processes the notification and initiates the automatic migration of the PSTN telephone number on detection of loop unbundling (FXODCVoltageRemoved value is False or 0). The management server queries the PSTN subscriber database to get the subscriber PSTN telephone number. The management server issues a configuration command to the Gateway VoIP module to apply a new or additional telephone number. In particular, it uses the SIP URI in case of SIP as VoIP signaling protocol. It also issues a configuration command to the VoIP Server to apply a new or additional telephone number of the specific subscriber. It allows the SIP registrar of gateway User agent with this SIP URI.

The customer can then initiate and receive voice calls using the same telephone number, but the voice calls are via VoIP instead of PSTN.

When the line is unbundled, the detecting module still performs the current/voltage detection. When detected, the gateway informs the ACS about the detection. When the ACS is notified that there is line current while it expects the line/loop to be unbundled, it consults the VoIP server to find the phone number in use by the customer and configures it in the PSTN network.

The state machine allows flexible configuration of the detection thresholds and signals several detection states and alarm states to the TR69 agent via SetParameterAttributes RPC/command of the TR69 protocol, as indicated in the table below.

| Parameter name | Type | Range | Default Value | Explanation | Access |
|---|---|---|---|---|---|
| .X_00E50_SignalReinjection | Bool | [0, 1] | 0 | Signals the capability, based on default setting in bootROM, 0 = Disabled; 1 = Enabled | R |

| Parameter name | Type | Range | Default Value | Explanation | Access |
|---|---|---|---|---|---|
| .X_00E50_FXODCVoltageRemoved | Bool | [0, 1] | 0 | Signals the presence of PSTN CO line feed → active send required for state changes | R |
| .X_00E50_FXSAlarm | Bool | [0, 1] | 0 | Signals if there has been an alarm condition | R |
| .X_00E50_FXODCThreshold_V | Int | [1, 100] | 2 | Detection Threshold (V) for PSTN CO | R/W |
| .X_00E50_FXODCThreshold_I | Int | [1, 100] | 4 | Detection Threshold (mA) for PSTN CO | R/W |

The mapping between the state machine variables to the gateway data model (IGD) is as follows:
IGD Parameter:
 InternetGatewayDevice.Services.VoiceService[i].X_00E50_FXODCVoltageRemoved
State Machine Variable:
 SW_ON_flag.
Values:
 SW_ON_flag=0→X_00E50_FXODCVoltageRemoved=0[FXO is on the line]
 SW_ON_flag=1→X_00E50_FXODCVoltageRemoved=1[FXO is on the line]
IGD Parameter:
 InternetGatewayDevice.Services.VoiceService[i].X_00E50_FXSAlarm
State Machine Variable:
 FXS_ALARM
Values:
 FXS_ALARM=0→X_00E50_FXSAlarm=0[No FXS alarm state, normal operation]
 FXS_ALARM=1→X_00E50_FXSAlarm=1[FXS alarm state detected]
IGD Parameter:
 InternetGatewayDevice.Services.VoiceService[i].X_00E50_FXODCThreshold_V
State Machine Variable:
FXO_CO_line_voltage_threshold
Values:
 This parameter can be programmed from the remote TR69 agent or overwritten locally via system defaults. If an overwrite happens, an "active" update of the TR69 remote value is needed.
IGD Parameter:
 InternetGatewayDevice.Services.VoiceService[i].X_00E50_FXODCThreshold_1
State Machine Variable:
 FXO_CO_line_current_threshold
Values:
 This parameter can be programmed from the remote TR69 agent or overwritten locally via system defaults. If an overwrite happens, an "active" update of the TR69 remote value is needed.
References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:
1. Gateway device comprising:
 a first interface to a residential phone wiring, said first interface enabling the gateway device to be connected to a central office, said residential phone wiring comprising more than one plugging means for connecting at least one analog phone device,
 said central office being configured to provide a first voice service to said at least one analog phone device,
 a broadband interface for connecting the gateway device to the internet,
 an FXS module for providing a voice over IP service over said broadband interface to said at least one analog phone device when the first voice service is disabled,
 unbundling detection means for detecting the presence of the first voice service, for connecting the FXS module to the residential phone wiring when the first voice service is disabled, and for disconnecting the FXS module from the residential phone wiring when the first voice service is enabled, the presence of the first voice service being based on the detection of current and voltage on the first interface, and
 a management agent for informing a gateway management server when changing from the first voice service to the voice over IP service and vice versa, so that the same phone number can be used when using said first voice service or said voice over IP service;
 wherein the unbundling detection means is configured to measure the voltage of the line between an FXO module of said gateway and the central office when the first voice service is disabled and when said FXS module is disconnected from the residential phone wiring.
2. The gateway device according to claim 1, further comprising an FXO module configured to detect the presence of the first voice service when said FXS module is disconnected from the residential phone wiring.

3. The gateway device according to claim 1, wherein the FXS module is configured to detect the presence of the first voice service when said FXS module is connected to the residential phone wiring.

4. The gateway device according to claim 2, wherein the FXO module performs the detection of the presence of the first voice service based successively on the voltage level and the current level on the line between the FXO module and the central office.

5. The gateway device according to claim 3, wherein the FXS module performs the detection of the presence of the first voice service based successively on the current level and the voltage level on the line between the FXS module and the central office.

6. Method in a gateway comprising a first interface to a residential phone wiring, said first interface enabling the gateway device to be connected to a central office, said residential phone wiring comprising more than one plugging means for connecting at least one analog-phone device, said central office being configured to provide a first voice service to said at least one analog phone device, a broadband interface for connecting said gateway device to the internet, an FXS module for providing voice over IP services over said broadband interface to said at least one analog phone device when the first voice service is disabled, said method comprising the steps of:
  detecting the presence of the first voice service;
  connecting the FXS module to the residential phone wiring when the first voice service is disabled;
  disconnecting the FXS module from the residential phone wiring when the first voice service is enabled, the presence of the first voice service being based on the detection of current and voltage on the first interface;
  informing a gateway management server when changing from the first voice service to the voice over IP service and vice versa, so that the same phone number can be using said first voice service or said voice over IP service; and
  measuring the voltage of the line between an FXO module of said gateway device and the central office when the first voice service is disabled and when said FXS module is disconnected from the residential phone wiring.

7. The method according to claim 6, further comprising the steps of:
  if a first voice service is present, and said FXS module is connected to the residential phone wiring, disconnecting the FXS module from the residential phone wiring, and
  signaling the FXS disconnection from the residential phone wiring to a remote server so that the same phone number can be used when using said first voice service or said VoIP service.

8. The method according to claim 6, wherein the detection of a first voice service is continuously performed.

9. The method according to claim 6, further comprising the steps of,
  if said voltage is above said FXO_voltage_threshold, measuring the current on said line, and
  connecting said FXS module to the residential phone wiring only if said current is below a FXO_current_threshold.

10. The method according to claim 6, further comprising the steps of,
  if said FXS module is connected to the residential phone wiring, measuring the current of the line between the FXS module and the central office,
  if said current is above a FXS_current_threshold value, measuring the voltage of said line, and
  if said voltage is above a FXS_voltage_threshold value, disconnecting said FXS module from the residential phone wiring.

* * * * *